United States Patent [19]

Van Overmeire

[11] Patent Number: 5,081,533
[45] Date of Patent: Jan. 14, 1992

[54] METHOD AND APPARATUS FOR ENCODING A TELEVISION SIGNAL ACCORDING TO A NUMBER OF PROCESSING OPERATIONS PROVIDING DIFFERENT DISTRIBUTIONS OF SPATIAL AND/OR TEMPORAL RESOLUTION

[75] Inventor: Philippe A. M. Van Overmeire, Eindhoven, Netherlands

[73] Assignee: U.S. Philips Corporation, New York, N.Y.

[21] Appl. No.: 537,560

[22] Filed: Jun. 13, 1990

[30] Foreign Application Priority Data

Jun. 14, 1989 [NL] Netherlands ............ 8901504

[51] Int. Cl.$^5$ ............................................. H04N 7/12
[52] U.S. Cl. .................................... 358/141; 358/138
[58] Field of Search ............... 358/141, 133, 138, 105, 358/140

[56] References Cited

U.S. PATENT DOCUMENTS

| | | | |
|---|---|---|---|
| 4,654,484 | 3/1987 | Reiffel et al. | 358/133 |
| 4,692,806 | 9/1987 | Anderson et al. | 358/126 |
| 4,965,667 | 10/1990 | Trew et al. | 358/138 |
| 4,985,767 | 1/1991 | Haghiri et al. | 358/138 |
| 5,031,039 | 7/1991 | Haghiri et al. | 358/105 X |

Primary Examiner—Victor R. Kostak
Attorney, Agent, or Firm—Michael E. Marion

[57] ABSTRACT

An arrangement for encoding a television signal including a video signal, comprising a circuit for producing an encoded television signal in accordance with a number of possible processing operations on the video signal, each processing operation providing a different distribution of spatial and/or temporal resolution, a circuit for obtaining a provisional selection for one processing operation on the video signal from the number of possible processing operations and for controlling a spatial and/or temporal consistency of said provisional selection for a processing operation on a portion of a picture of the video signal compared with selections for processing operations on spatially and/or temporally adjacent portions, to obtain a consistent selection, said consistency control comprising a spatial/temporal consistency control and a spatial consistency control, to obtain a television signal encoding with an improved consistency control, and a circuit for selecting one processing operation on the video signal from the number of possible processing operations on the basis of the consistent selection.

14 Claims, 1 Drawing Sheet

METHOD AND APPARATUS FOR ENCODING A TELEVISION SIGNAL ACCORDING TO A NUMBER OF PROCESSING OPERATIONS PROVIDING DIFFERENT DISTRIBUTIONS OF SPATIAL AND/OR TEMPORAL RESOLUTION

BACKGROUND OF THE INVENTION

The invention relates to a method of encoding a television signal including a video signal, the method comprising producing an encoded television signal according to a number of possible processing operations on the video signal, each processing operation providing a different distribution of spatial and/or temporal resolution, provisionally selecting one of said processing operations on the video signal from the number of possible processing operations, controlling a spatial and/or temporal consistency to obtain a consistent selection, and selecting one processing operation on the video signal from the number of possible processings on the basis of said consistent selection.

The invention also relates to an arrangement for encoding a television signal including a video signal, comprising means for producing an encoded television signal according to a number of possible processing operations on the video signal, each processing operation providing a different distribution of spatial and/or temporal resolution, means for provisionally selecting one of the processing operations on the video signal from the number of possible processing operations and for controlling a spatial and/or temporal consistency, to obtain a consistent selection, and means for selecting one processing operation on the video signal from the number of possible processings on the basis of said consistent selection.

Such a method and such an arrangement are described in the article "HD-MAC coding for Broadcasting of High-Definition television signals", read at the Club de Rennes "Hound Researchers" Seminar, M.I.T. Cambridge, Mass., U.S., Oct. 9–13, 1988. In the encoding described in this article, the provisional selection comprises an a posteriori decision, and an a priori decision followed by the consistency control, and the final selection is established on the basis of the a posteriori decision and the a priori decision made consistent.

It is inter alia an object of the invention to provide a television signal encoding having an improved consistency control.

SUMMARY OF THE INVENTION

According to a first aspect of the invention, to achieve this object, a method of encoding a television signal including a video signal is provided, which method comprises the steps of producing an encoded television signal according to a number of possible processing operations on the video signal, each processing operation providing a different division into spatial and/or temporal resolution, obtaining a provisional selection for one processing operation on the video signal from the number of possible processing operations, controlling a spatial and/or temporal consistency of a selection of a processing operation on a part of a picture of the video signal compared with selections of processing operations on spatially and/or temporarily adjacent parts, to obtain a consistent selection, said consistency control comprising a spatial temporal consistency control and a spatial consistency control and selecting one processing operation on the video signal from the number of possible processing operations on the basis of said consistent selection.

According to a second aspect of the invention, to achieve the object of the invention, an arrangement for encoding a television signal including a video signal is provided comprising means for producing an encoded television signal according to a number of possible processing operations on the video signal, each processing operation providing a different distribution of spatial and/or temporal resolution, means for obtaining a provisional selection for one processing operation on the video signal from the number of possible processing operations and for controlling a spatial and/or temporal consistency of a selection for a processing operation on a part of a picture of the video signal compared with selections for processing operations on spatially and/or temporally adjacent parts to obtain a consistent selection, said consistency control comprising a spatial/temporal consistency control and a spatial consistency control and means for selecting one processing on the video signal from the number of possible processing operations on the basis of the consistent selection.

A particularly good result appeared to be possible in practice if a consistency control is used which comprises, arranged one after the other, a first spatial consistency control, the spatial/temporal consistency control and a second spatial consistency control.

BRIEF DESCRIPTION OF THE DRAWINGS

These and other (more detailed) aspects of the invention will now be described and elucidated in greater detail by way of non-limitative example with reference to the accompanying drawing, in which.

DETAILED DESCRIPTION OF PREFERRED EMBODIMENTS OF THE INVENTION

Figure 1:
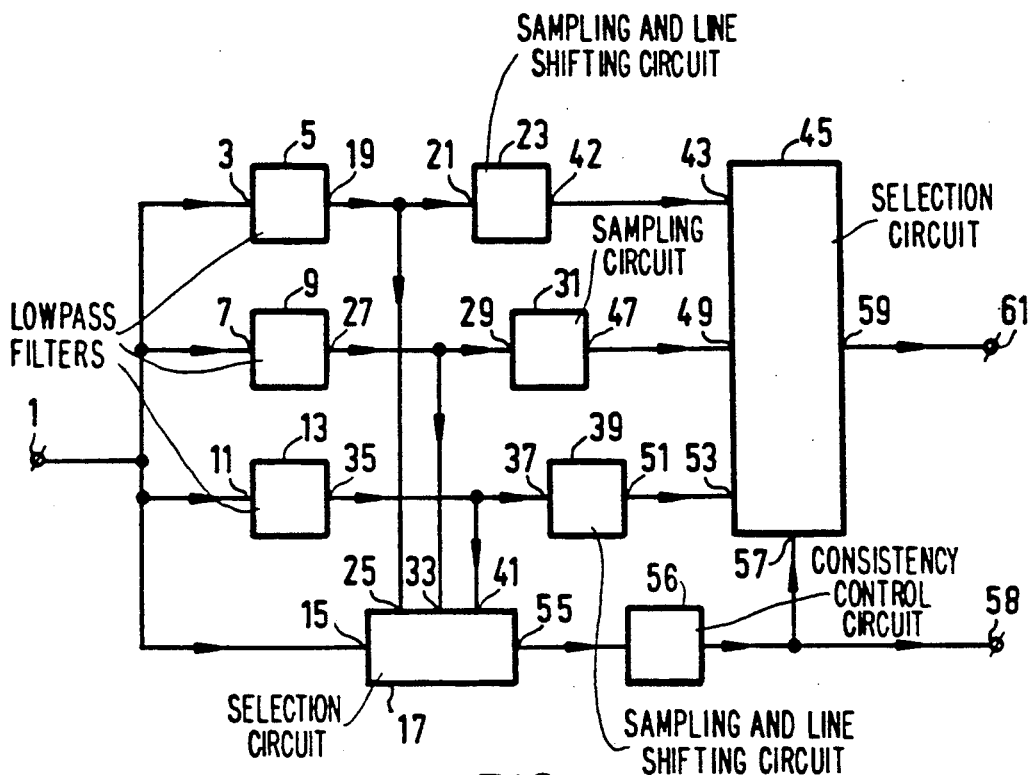
FIG. 1 is a block circuit diagram of an encoding arrangement according to the invention, from which components which are not necessary for a proper understanding of the invention have been omitted.

In FIG. 1 a video signal to be encoded is applied to an input 1 of the encoding circuit according to the invention. The input 1 is connected to an input 3 of a low-pass filter 5, to an input 7 of a low-pass filter 9, to an input 11 of a low-pass filter 13, and to an input 15 of a selection circuit 17. An output 19 of the low-pass filter 5 is connected to an input 21 of a sampling and line shifting circuit 23 and to an input 25 of the selection circuit 17. An output 27 of the low-pass filter 9 is connected to an input 29 of a sampling circuit 31 and to an input 33 of the selection circuit 17. An output 35 of the low-pass filter 13 is connected to an input 37 of a sampling and line shifting circuit 39 and to an input 41 of the selection circuit 17. An output 42 of the sampling and line shifting circuit 23 is connected to an input 43 of a selection circuit 45. An output 47 of the sampling circuit 31 is connected to an input 49 of the selection circuit 45. An output 51 of the sampling and line shifting circuit 39 is connected to an input 53 of the selection circuit 45. An output 55 of the selection circuit 17 is connected, via a consistency control circuit 56, to a control input 57 of the selection circuit 45 and to a DATV-output 58 of the encoding arrangement according to the invention. An output 59 of the selection circuit 45 applies an encoded video signal to a video signal output 61 of the encoding arrangement according to the invention.

The blocks 5 and 23 form part of a 20 ms branch, the blocks 9 and 31 form part of a 40 ms branch, and the blocks 13 and 39 form part of a 80 ms branch of a HD-MAC encoding arrangement as described in, for example, the said article and the non-prepublished European Patent Application EP-A 0.322.956 (U.S. patent application Ser. No. 288,058, filed Dec. 20, 1988), which are included by way of reference in the present Patent Application and to which reference is made for a detailed description of the HD-MAC encoding arrangement.

The selection circuit 17 compares output signals of the low-pass filters 5, 9 and 13 with the video signal to be encoded and controls the selection circuit 45 in such a way that basically this circuit supplies from the processed video signal supplied via the branches of the encoding arrangement that processed video signal from its output 55 that matches the video signal to be encoded to the best possible extent. If the output 55 of the selection circuit 17 were directly connected to the control input 57 of the selection circuit 45, a processed video signal would be produced in which spatially adjacent and/or temporally adjacent blocks of picture elements in a picture of the video signal are encoded by very different branches of the encoding arrangement, whereby a very unattractive result is obtained and the quality expected of the high-definition television would not be achieved.

To avoid this, the consistency control circuit 56 is included in the arrangement to control a spatial/temporal consistency and a spatial consistency of a selection for a processing operation on a block in comparison with selections for processing operations on spatially and/or temporally adjacent blocks.

In practice, in accordance with an embodiment of the invention, a very good result appeared to be possible with a consistency control comprising the means for performing the following steps, in which preferably only the four horizontally and vertically neighboring blocks are spatially taken into account:

1. Altering a selection for a processing operation on a block which deviates from selections for processing operations on spatially adjacent blocks (a first spatial consistency control).

2. Altering spatially and/or temporally isolated selections (a spatial/temporal consistency control).

3. Eliminating remaining spatially isolated selections (a second spatial consistency control).

Step 1 is preferably performed in such a manner that a selection for a processing operation on a block deviating from mutually equal processing operations on all spatially adjacent blocks is changed into the selection for the processing operation which is performed on the adjacent blocks.

Step 2 is preferably further developed as follows, blocks having a selection for a processing operation according to the 20, 40 or 80 ms branch being alternatively denoted 20, 40, 80 ms blocks, respectively:

a: 80 ms blocks are considered as being isolated when they have no temporally adjacent 80 ms blocks, or when they have less than three spatially adjacent 80 ms blocks. Such isolated 80 ms blocks are changed into 40 ms blocks.

b: 20 ms blocks are only considered as being isolated, when they have no spatially adjacent 20 ms block, ad are changed into 40 ms blocks in that case.

c1: 40 ms blocks are changed into 80 ms blocks when all four spatially adjacent blocks are 80 ms blocks, provided that no temporally adjacent block is a 20 ms block.

c2: 40 ms blocks are changed into 20 ms blocks when both temporally adjacent blocks are 20 ms blocks, provided that at least one spatially adjacent block is a 20 ms block. 40 ms blocks are also changed into 20 ms blocks when all four spatially adjacent blocks are 20 ms blocks, provided that either at least one temporarily adjacent block is a 20 ms block or that both temporally adjacent blocks are 40 ms blocks.

Step 3 is preferably further developed as follows: a 20 ms block among four blocks encoded according to another branch, becomes a 40 ms block, a 80 ms block among four blocks encoded according to another branch, becomes a 40 ms block, a 40 ms block among four 80 ms blocks becomes a 80 ms block and a 40 ms block among four 20 ms blocks becomes a 20 ms block.

In a system having motion compensation in the 40 ms branch, the motion vectors already calculated are used as the corresponding motion vectors, if a selection is changed into a selection of a processing operation according to the 40 ms branch.

Figure 2:
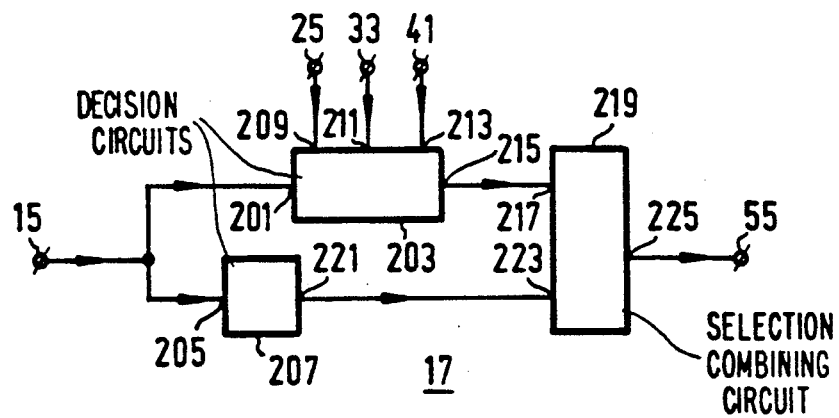
FIG. 2 shows a selection circuit for use in the encoding arrangement according to the invention.

In FIG. 2, in which a possible embodiment of the selection circuit 17 is shown, the input 15 of the selection circuit 17 is connected to an input 201 of an a posteriori decision circuit 203 and to an input 205 of an a priori decision circuit 207. The inputs 25, 33 and 41 of the selection circuit 17 are connected to inputs 209, 211 and 213 of the a posteriori decision circuit 203. An output 215 of the a posteriori decision circuit 203 is connected to a first input 217 of a selection combining circuit 219. An output 221 of the a priori decision circuit 207 is connected to a second input 223 of the selection combining circuit 219. The selection combining circuit 219 combines the a priori and a posteriori decisions, and supplies the combined selection from an output 225, connected to the output 55 of the selection circuit 17. The a posteriori decision circuit 203 compares the output signals of the low-pass filters 5, 9 and 13 with the video signal to be encoded, and supplies from its output 215 a signal indicating which processed video signal corresponds best to the video signal to be encoded. The a priori decision circuit 207 measures the value of the motion in the video signal to control, if that value exceeds a predetermined threshold, the selection combining circuit 219 in such a way that the 20 ms branch is selected. For a more detailed description of the mode of operation of the selection circuit 17 shown in FIG. 2, reference is made to the said article.

Contrary to the selection circuit described in said article, in the encoding arrangement according to the invention, the consistency control circuit 56 is located at the output 55 of the selection circuit 17. This has the advantage that not only the decision of the a priori decision circuit 207 is made consistent, but also the combined selection, so tat a much quieter display is achieved. More specifically, a sudden and often isolated flashing of high-resolution blocks is avoided. Local reduction in resolution is now also significantly reduced.

I claim:

1. A method of encoding a television signal including a video signal, the method comprising the steps of:
producing an encoded television signal according to a number of possible processing operations on the video signal, each processing operation providing a different distribution of spatial and/or temporal resolution;

obtaining a provisional selection for one of the processing operations on the video signal from the number of possible processing operations;

controlling a spatial and/or temporal consistency of said provisional selection for a processing operation on a part of a picture of the video signal compared with selections for processing operations on spatially and/or temporally adjacent parts, to obtain a consistent selection, said consistency control comprising a spatial/temporal consistency control and a spatial consistency control; and selecting one processing operation on the video signal from the number of possible processing operations on the basis of said consistent selection.

2. A method as claimed in claim 1, wherein said consistency control comprises the steps of performing a first spatial consistency control, the spatial/temporal consistency control and a second spatial consistency control.

3. A method as claimed in claim 2, wherein said first spatial consistency control comprises a change from a provisional selection for a processing operation on a block of picture elements deviating from mutual equal selections for processing operations on all the adjacent blocks, into the selection for the processing operation on those adjacent blocks.

4. A method as claimed in claim 1, wherein in the consistency control, only horizontally or vertically adjacent blocks are spatially considered.

5. A method as claimed in claim 1, wherein the provisional selection for a processing operation is based on an a posteriori decision and on an a priori decision.

6. An arrangement for encoding television signal including a video signal, comprising:

means for producing an encoded television signal in accordance with a number of possible processing operations on the video signal, each processing operation providing a different distribution of spatial and/or temporal resolution;

means for obtaining a provisional selection for one processing operation on the video signal from the number of possible processing operations and for controlling a spatial and/or temporal consistency of said provisional selection for a processing operation on a portion of a picture of the video signal compared with selections for processing operations on spatially and/or temporally adjacent portions, to obtain a consistent selection; and means for selecting one processing operation on the video signal from the number of possible processing operations on the basis of said consistent selection.

7. An arrangement as claimed in claim 6, wherein said consistency controlling means per forms, one after the other, a first spatial consistency control, the spatial/temporal consistency control and a second spatial consistency control.

8. An arrangement as claimed in claim 7, wherein said said first spatial consistency control comprises a change of a provisional selection for a processing operation on a block of picture elements deviating from mutual equal choices of processing operations on all the adjacent blocks, into the selection for the processing operation on those adjacent blocks.

9. An arrangement as claimed in claim 6, wherein the consistency controlling means spatially considers only horizontally or vertically adjacent blocks.

10. An arrangement as claimed in claim 6, wherein said selection obtaining means comprise an a posteriori decision circuit and an a priori decision circuit.

11. A method as claimed in claim 2 wherein in the consistency control, only horizontally or vertically adjacent blocks are spatially considered.

12. A method as claimed in claim 3 wherein in the consistency control, only horizontally or vertically adjacent blocks are spatially considered.

13. An arrangement as claimed in claim 7 wherein the consistency controlling means spatially considers only horizontally or vertically adjacent blocks.

14. An arrangement as claimed in claim 8 wherein the consistency controlling means spatially considers only horizontally or vertically adjacent blocks.

* * * * *